(12) United States Patent
Nakano et al.

(10) Patent No.: US 6,170,192 B1
(45) Date of Patent: *Jan. 9, 2001

(54) LEADER FOR FLY FISHING

(75) Inventors: Eishou Nakano, Ibaraki-ken; Seiichi Ohira; Toshiya Mizuno, both of Tsuchiura, all of (JP)

(73) Assignee: Kureha Kagaku Kogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/194,776

(22) PCT Filed: Mar. 18, 1997

(86) PCT No.: PCT/JP97/00871

§ 371 Date: Jan. 12, 1999

§ 102(e) Date: Jan. 12, 1999

(87) PCT Pub. No.: WO97/46088

PCT Pub. Date: Dec. 11, 1997

(30) Foreign Application Priority Data

Jun. 5, 1996 (JP) .................................................. 8-165228

(51) Int. Cl.[7] .................................................. A01K 91/16

(52) U.S. Cl. .......................................................... 43/44.98

(58) Field of Search .............................................. 43/44.98

(56) References Cited

U.S. PATENT DOCUMENTS

| 3,864,865 | 2/1975 | Swisher . |
|---|---|---|
| 4,353,960 | 10/1982 | Endo et al. . |
| 4,606,144 | 8/1986 | Sasaki et al. . |

FOREIGN PATENT DOCUMENTS

| 295 03 682 U1 | 8/1995 | (DE) . |
|---|---|---|
| 0 753 251 | 1/1997 | (EP) . |
| 0 753 251 A1 | 1/1997 | (EP) . |
| 09262047 | 10/1997 | (EP) . |
| 57-143511 | 3/1981 | (JP) . |
| 57-143511 | 9/1982 | (JP) . |
| 60-59115 | 4/1985 | (JP) . |
| 60-181314 | 9/1985 | (JP) . |
| 60-209008 | 10/1985 | (JP) . |
| 60-209009 | 10/1985 | (JP) . |
| 62-186732 | 8/1987 | (JP) . |
| 62-223315 | 10/1987 | (JP) . |
| 62-268811 | 11/1987 | (JP) . |
| 62-276019 | 11/1987 | (JP) . |
| 63-112717 | 5/1988 | (JP) . |
| 63-159527 | 7/1988 | (JP) . |
| 63-175112 | 7/1988 | (JP) . |
| 1-201515 | 8/1989 | (JP) . |
| 1-201516 | 8/1989 | (JP) . |

OTHER PUBLICATIONS

European Search Report.
Microfilm of the specification and drawings annexed to the written application of Japanese Utility Model Application No. 19156/1986 (No. 130476/1987) (Daiwa Seiko, Inc.), Aug. 18, 1987 (18.08/87) (Family: none Full descriptions, all drawings.
Orvis Catalog, p. 36–38, Dec. 1981.

*Primary Examiner*—Alexander S. Thomas
(74) *Attorney, Agent, or Firm*—Nixon & Vanderhye

(57) ABSTRACT

A leader for fly fishing which has a high knot strength and a high tensile tenacity, is free from the formation of a shape-unstable portion (constriction) having a smaller diameter than an average thread diameter of the tippet section and the occurrence of melt fracture at a connecting portion between the tapered section and the tippet section, and shows an excellent natural drift property, can be produced by using a vinylidene fluoride-based resin having an inherent viscosity of 1.0 to 1.7 dl/g.

4 Claims, 1 Drawing Sheet

D: ENLARGED VIEW

LEADER FOR FLY FISHING

TECHNICAL FIELD

The present invention relates to a leader for fly fishing. More particularly, the present invention relates to a leader for fly fishing, which comprises a butt section, a tapered section and a tippet section; comprises a vinylidene fluoride-based resin whose viscosity lies in a specific range, thereby exhibiting a high tensile strength or tenacity; and is so improved as to inhibit a shape-unstable portion (constriction) having a smaller diameter than an average diameter of the tippet section, and melt fracture from being formed at a connecting portion between the tapered section and the tippet section, thereby exhibiting an excellent natural drift property.

BACKGROUND ART

The fly fishing is a fishing method of casting a fly without weight and float from a remote position unable to be sensed by fishes, and drifting the fly on or in water. To meet such requirements, in the fly fishing, there has been used a five-part fishing equipment comprising a fly rod, a reel, a fly line, a leader and a fly.

Among these parts, as the leader, there have been preferably used those leaders which are reduced in thread diameter to realize natural drift thereof. The leader has been further required to have a tapered section through which an inertia force is smoothly transmitted from the fly line to the fly upon casting, thereby enabling the fly to be quietly dropped on a water surface. Consequently, the leader has been usually composed of a portion called "butt" and having a larger thread diameter, which is connected with the fly line, a portion called "taper" and having a tapered shape, and a portion called "tippet" and having a smaller thread diameter, at which the fly is fitted to the leader. Incidentally, in FIG. 1(a) showing an explanatory view of the above-mentioned leader, reference numeral (1) represents the leader, (2) represents the butt section (A), (3) represents the tapered section (B), and (4) represents the tippet section (C).

In addition, the leader is preferably comprising a material whose refractive index is close to that of water, so as to be unsensed by fishes. As such the materials having a refractive index close to that of water, there may be exemplified vinylidene fluoride-based resins. However, when the vinylidene fluoride-based resins are subjected to spinning process, it has been difficult to obtain a leader having a smooth shape. Especially, in the production of a tapered leader, a shape-unstable portion 6 (constriction) having a smaller diameter than an average diameter of the tipped section is formed at a connecting portion between the tapered section (B) and the tippet section (C), so that a stress due to tension caused upon fishing-up is concentrated on the constricted portion, thereby causing the leader to be cut thereat.

Further, in the case where the vinylidene fluoride-based resins are subjected to the spinning process, the obtained leader tends to suffer from melt fracture. Especially, the melt fracture is more remarkably caused upon the production of tapered leaders. That is, since the tapered leader is composed of the butt section (A), the tapered section (B) and the tippet section (C), it is required that the diameter of the leader is varied corresponding to the respective sections, so that the melt fracture is likely to occur. When a raw thread having such melt fracture is stretched to impart a mechanical strength thereto, the raw thread not only suffers from breakage but also is deteriorated in appearance of the surface thereof. Further, when vinylidene fluoride-based resins having an inherent viscosity less than the specific value is used to produce a leader, the obtained leader is deteriorated in natural drift property.

The present invention has been attained to overcome the above-mentioned problems. It is an object of the present invention to provide a leader for fly fishing which comprises a vinylidene fluoride-based resin, can show a high tensile strength or tenacity, is improved so as to inhibit a shape-unstable portion 6 (constriction) having a smaller diameter than an average diameter of the tippet section and melt fracture from being formed at a connecting portion between the tapered section (B) and the tippet section (C), and can exhibit an excellent natural drift property and a good appearance.

DISCLOSURE OF THE INVENTION

That is, in an aspect of the present invention, there is provided a leader for fly fishing, which comprises a vinylidene fluoride-based resin, and comprises a butt section, a tapered section and a tippet section, the inherent viscosity of the vinylidene fluoride-based resin being 1.0 to 1.7 dl/g.

The present invention is explained in detail below. The leader for fly fishing according to the present invention (hereinafter referred to merely as "leader") is formed of a vinylidene fluoride resin-based monofilament, and is a so-called knotless tapered leader. As the vinylidene fluoride-based resin as a raw material, there may be exemplified vinylidene fluoride-based homopolymers, vinylidene fluoride-based copolymers or a mixture thereof.

It is necessary that the vinylidene fluoride-based copolymers are selected from those capable of exhibiting a ductility and a strength which are acceptable for the knotless tapered leader. As the vinylidene fluoride-based copolymers capable of satisfying these requirements, there may be exemplified copolymers of vinylidene fluoride and ethylene tetrafluoride, propylene hexafluoride, ethylene trifluoride, ethylene chloride trifluoride, vinyl fluoride or the like. These monomers other than vinylidene fluoride can be used singly or in combination of two or more thereof.

The inherent viscosity of the vinylidene fluoride-based resin as a raw resin of the leader, is 1.0 to 1.7 dl/g, preferably 1.10 to 1.35 dl/g, more preferably 1.15 to 1.35 dl/g, still more preferably 1.20 to 1.35 dl/g. When the inherent viscosity is less than 1.0 dl/g, the obtained leader cannot have a high tensile tenacity and it becomes difficult to control a length of the leader upon the production thereof, resulting in too long tapered section. The leader for fly fishing has been usually sold and used by a predetermined length, so that when the tapered section is elongated, the lengths of the remaining butt and tippet sections can no longer be increased. It is disadvantageous that such a leader cannot maintain a good natural drift property, thereby failing to accurately attack an aimed fishing point.

Meanwhile, in order to reduce the length of the tapered section, it may be considered to be reasonable that the time required for varying an extrusion output of the vinylidene fluoride-based resin and a take-off speed of the obtained thread is shortened. However, the varying time is usually about one second. When the varying time is shortened to less than one second, it takes a long time to stabilize the extrusion output and the take-off speed, so that unevenness of thread tends be formed at the butt and tippet sections.

When the inherent viscosity exceeds 1.7 dl/g, there may be a tendency that an shape-unstable portion 6 (constriction)

having a smaller diameter than an average diameter of the tippet section is generated at a connecting portion between the tapered section (B) and the tippet section (C), so that a stress is concentrated on the constricted portion upon fishing-up, thereby causing thread breakage of the leader. Besides, the melt fracture tends to be caused at the connecting portion, so that when the leader is stretched, thread breakage is likely to occur and the surface of the obtained leader is deteriorated in appearance.

The vinylidene fluoride-based resins may further contain a plasticizer, a heat stabilizer, an acrylic resin, a crystal nucleating agent, a lubricant or the like. Especially, in order to smoothly cast the leader or accurately drop the fly on the aimed fishing position, it is required that curl or kink of the leader reeled can be readily eliminated when unreeled. For this reason, it is preferred to add the plasticizer in an amount of 1 to 10% by weight.

As the plasticizers added to the vinylidene fluoride-based resins, there may be exemplified aliphatic polyesters. Examples of the preferred aliphatic polyesters may include aliphatic polyesters produced from esters of aliphatic dialcohol having 2 to 4 carbon atoms and aliphatic dicarboxylic acid having 2 to 6 carbon atoms, and aliphatic polyesters produced from cyclic esters having 3- to 7-membered ring. As the aliphatic dialcohols having 2 to 4 carbon atoms, there may be exemplified ethylene glycol, propylene glycol, 1,4-butane diol, 1,2-butane diol or the like. As the aliphatic dicarboxylic acids having 2 to 6 carbon atoms, there may be exemplified oxalic acid, malonic acid, succinic acid, glutaric acid, adipic acid or the like.

In addition, as the cyclic esters having 3- to 7-membered ring, there may be exemplified β-propiolactone, γ-butylolactone, δ-valerolactone, ε-caprolactone or the like.

It is preferred to use a composition obtained by mixing the vinylidene fluoride-based resin with the plasticizer using a ribbon blender, a high-speed mixer (Henschel mixer), a fixed V-type blender, a tumbler, a ball mill or the like, further mixing the resultant mixture with additives, if required, using a blender, and then melt-kneading the obtained mixture using an extruder.

As the melt-spinning temperature, there may be adopted any temperature in the range of not less than a melting point of the vinylidene fluoride-based resin used and not more than a thermal decomposition temperature thereof. In order to maintain a stable spinning property, the melt-spinning temperature is usually 200 to 300° C., preferably 230 to 280° C.

The amount of the vinylidene fluoride-based resin discharged and melt-extruded from a spinning nozzle of the extruder and the take-off speed of the raw thread may be controlled according as respective thread diameters and lengths of the butt section, the tapered section and the tippet section.

For example, in the case where the butt section having a raw thread diameter of 800 to 1,800 μm, the tapered section and the tippet section having a thread diameter of 280 to 1,100 mm are successively formed, the amount of resin discharged for the butt section is 1.0 to 3.5 cc/min and the take-off speed thereof is 1 to 3 m/min; and the amount of resin discharged for the tippet section is 0.5 to 3.0 cc/min and the take-off speed thereof is 3 to 10 m/min. Further, by varying a rotating speed of a gear pump and a peripheral speed of pinch rolls, the amount of resin discharged for the butt section is reduced to 10 to 90% and the take-off speed thereof is increased to 100 to 1,000%, for 0.5 to 3 seconds, thereby forming the tapered section.

In the course of varying the above-mentioned amount discharged and the take-off speed (for 0.5 to 3 seconds), the tapered section and then the tippet section are formed. Also, when the tippet section, the tapered section and the butt section are formed in this order, the above-mentioned step of varying the amount discharged and the take-off speed may be conversely conducted.

In the production of the raw thread, the distance (air gap) between the spinning nozzle and a cooling bath may be set to usually 20 to 300 mm, preferably 30 to 250 mm.

After passing through the air gap, the molten vinylidene fluoride-based resin is cooled in the cooling bath and then solidified. As the coolants used in the cooling bath, there may be exemplified water, inorganic salt-containing water, alcohols, polyethylene glycol, glycerol and mixtures thereof. The cooling temperature is preferably less than such a temperature that bubbles due to boiling are formed at an interface between the coolant and the molten resin. For example, when the coolant is water, the cooling temperature may be usually 20 to 50° C., preferably 30 to 45° C.

The above-mentioned tapered raw thread comprising the vinylidene fluoride-based resin is stretched in a bath at a temperature of 150 to 300° C. As the heating medium used in the stretching bath, there may be exemplified liquid heating media such as boiling water or glycerol, gaseous heating media such as air, steam or a nitrogen gas, or the like. Among these heating media, glycerol is preferred. In the case where the liquid heating medium is used, the stretching temperature is preferably 150 to 180° C. Especially when the glycerol is used, the stretching temperature is more preferably 160 to 175° C., still more preferably 165 to 172° C. In the case where the gaseous heating medium is used, the stretching temperature is preferably 200 to 250° C.

The stretching of the tapered raw thread may be conducted either at a single stage or at two or more multiple stages. From the standpoint of improvement in strength, the total stretching ratio is usually 4.0 to 7.0 times, preferably 4.5 to 6.5 times, more preferably 4.8 to 6.3 times.

After stretching, the tapered raw thread may be subjected to relaxation heat-treatment. The temperature used in the relaxation heat-treatment is usually 70 to 180° C., and the percentage of relaxation is usually 2 to 10%. Further, in the case where the leader is floated over a water surface upon use, the leader obtained by the above-mentioned method may be coated with a water repellant or an oiling agent.

The thread diameters of the respective sections of the leader are usually as follows. The thread diameter of the butt section is usually 300 to 800 μm; and the thread diameter of the tippet section is usually 50 to 600 μm. In general, there have been used such leaders having a ratio value of a thread diameter of the tippet section to that of the butt section of 0.1 to 0.7.

The leader comprising a vinylidene fluoride-based resin according to the present invention has an inherent viscosity of 1.0 to 1.7 dl/g. As a result, there can be provided a leader which can exhibit a high tensile tenacity, is free from the formation of a shape-unstable portion (constriction) having a smaller diameter than an average thread diameter of the tippet section and the occurrence o melt fracture at a connecting portion between the tapered section and the tippet section, and can show an excellent natural drift property and a good appearance.

BEST MODE FOR CARRYING OUT THE INVENTION

Figure 1A:
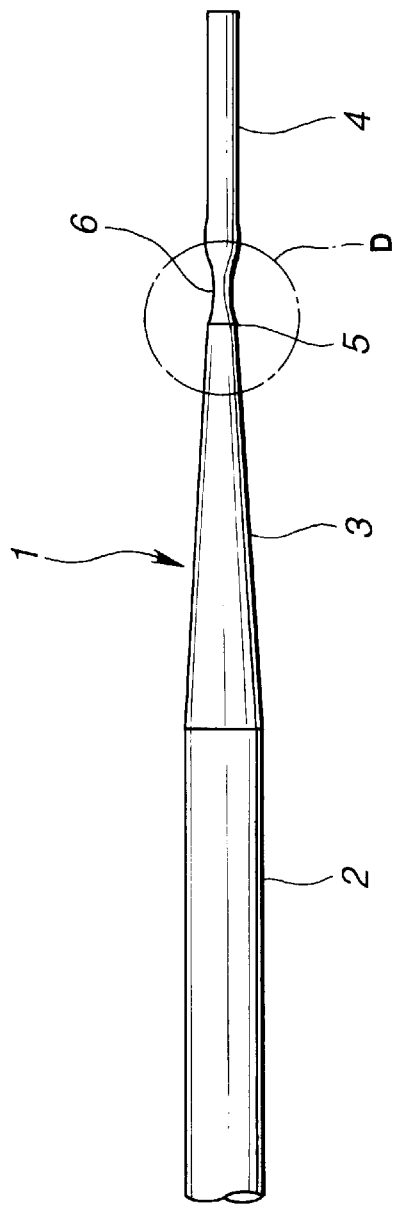
FIG. 1(a) is an explanatory view of a leader.
Figure 1B:
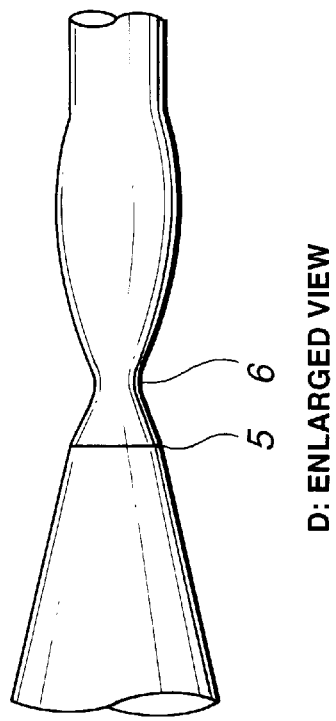
FIG. 1(b) is an enlarged view of a connecting portion (5) of the leader (1) shown in FIG. 1(a).

The present invention will now be described in more detail with reference to the following examples, but the present invention is not restricted to the examples and various other modification are possible without deviating from the scope of the invention. The evaluation methods are as follows.

(1) Thread diameter: The change in thread diameter was measured at a thread transporting speed of 2 m/min by using an outer diameter-measuring device (a laser outer diameter-measuring device "L-3100" manufactured by KEYENCE CO., LTD.).

From the results of the above thread diameter measurements, an average value of the maximum and minimum thread diameters of the tippet section was determined as an average thread diameter of the tippet section, and an average value of the maximum and minimum thread diameters of the butt section was determined as an average thread diameter of the butt section.

(2) Strength and tenacity test: Ten leader samples each having a length of 30 cm were measured at 23° C. and an elastic stress rate of 300 mm/min by using a tensile tester (TENSILON "UT-M-III-100" manufactured by ORIENTEC CO., LTD.), thereby determining a knot tenacity of the tippet section of each sample. The knot strength was obtained by dividing the measured knot tenacity by a sectional area of the average thread diameter of the tippet section. Also, the tensile tenacity of each leader sample was measured under the same conditions as described above.

(3) Inherent viscosity: The inherent viscosity of a resin composition prepared by using dimethyl acetamide as a solvent and having a concentration of 0.4 g/dl was measured at 30° C.

(4) Existence or non-existence of constriction: The change in thread diameter was measured by using the above-mentioned outer diameter-measuring device to determine whether or not the constriction was caused.

(5) Occurrence or non-occurrence of melt fracture: The diameter of the raw thread was observed at a magnification of 40 times by using a microscope to determine whether or not the melt fracture was caused.

(6) Natural drift property: Using a fishing rod equipped with a reel onto which a leader obtained in each Example, a fly line and a fly were set, ten persons having a fly-fishing experience of not less than five years have played fly-fishing to determine whether or not the fly was able to continue a natural drift and whether or not the aimed fishing point was accurately attacked. The natural drift property was evaluated by classifying the results into three ranks shown in the following Table 1, and then an average thereof was obtained.

TABLE 1

| | |
|---|---|
| ○: | Natural drift of the fly was able to be continued and the aimed fishing point was able to be accurately attacked. |
| Δ: | it was rather difficult to continue the natural drift and accurately attack the aimed fishing point. |
| X: | it was extremely difficult to continue the natural drift and accurately attack the aimed fishing point. |

EXAMPLES 1 TO 4 AND COMPARATIVE EXAMPLES 1 TO 2

100 parts by weight of each of vinylidene fluoride-based resins each having an inherent viscosity shown in Table 2 and 5 parts by weight of a polyester plasticizer (aliphatic polyester composed of two aliphatic diols, i.e., propylene glycol and butane diol, and one aliphatic dicarboxylic acid, i.e., adipic acid) were mixed together by a Henschel mixer. The mixture was formed into pellets by using an extruder having a diameter of 35 mm.

The thus obtained pellets were extruded at 280° C. from six holes of a nozzle each having a diameter of 1.3 mm such that the amount discharged per one hole was A cc/mn shown in Table 2, and then passed through a cooling bath maintained at a temperature of 43° C. The thus obtained raw thread (butt section) was taken off by pinch rolls rotated at a take-off speed of A m/min for 15 seconds. Next, the amount discharged and the take-off speed were changed to B cc/min and B m/min, respectively, for one second. Then these conditions were maintained for 30 seconds to take off the raw thread (tippet section). Further, the amount discharged and the take-off speed were changed again to A cc/min and A m/min, respectively, for one second, and then such conditions were maintained for 15 seconds to take off the raw thread (butt portion). These steps were periodically repeated, thereby obtaining a tapered raw thread.

The thus obtained tapered raw thread was stretched in a glycerol bath maintained at a temperature of 169° C. at a stretching ratio of 5.6 times. The stretched raw thread was further subjected to 3% relaxation treatment in 80° C. warm water, and then cut into a leader composed of butt and tippet sections each having a length of 1 m. The spinning conditions and the properties of the obtained leader are shown in Table 2.

In Table 2, in the case of Comparative Example 2, since the raw thread was broken upon stretching, non-stretched raw thread was observed to determine whether or not the constriction and melt fracture were caused. When the inherent viscosity was less than 1.0 dl/g, both the knot strength and the tensile tenacity thereof were low and the length of the tapered section was large, so that it became extremely difficult to maintain continuous natural drift property and accurately attack the aimed fishing point (Comparative Example 1). On the other hand, when the inherent viscosity was more than 1.7 dl/g, the raw thread suffered from breakage upon stretching (Comparative Example 2).

TABLE 2

| | Examples | | | | | Comparative Examples | |
|---|---|---|---|---|---|---|---|
| | 1 | 2 | 3 | 4 | 5 | 1 | 2 |
| Inherent viscosity (dl/g) | 1.00 | 1.15 | 1.20 | 1.35 | 1.70 | 0.80 | 1.90 |
| Air gap (mm) | 100 | 100 | 100 | 100 | 100 | 100 | 100 |
| Take-off speed A (m/min) | 1.8 | 1.8 | 1.8 | 1.8 | 1.8 | 1.8 | 1.8 |
| Amount discharged A (cc/min) | 1.3 | 1.3 | 1.3 | 1.3 | 1.3 | 1.3 | 1.3 |
| Take-off speed B (m/min) | 5.0 | 5.0 | 5.0 | 5.0 | 5.0 | 5.0 | 5.0 |
| Amount discharged B (cc/min) | 0.6 | 0.6 | 0.6 | 0.6 | 0.6 | 0.6 | 0.6 |
| Average diameter of butt section ($\mu$m) | 410 | 410 | 410 | 410 | 410 | 410 | 410 |
| Average diameter of tippet section ($\mu$m) | 165 | 165 | 165 | 165 | 165 | 165 | — |
| Length of tapered section (m) | 1.0 | 1.0 | 0.9 | 0.9 | 0.9 | 1.4 | — |
| Knot strength of tippet section (kg/mm$^2$) | 60 | 63 | 63 | 62 | 60 | 38 | — |

TABLE 2-continued

|  | Examples | | | | | Comparative Examples | |
|---|---|---|---|---|---|---|---|
|  | 1 | 2 | 3 | 4 | 5 | 1 | 2 |
| Tensile tenacity of leader (kg) | 1.5 | 1.7 | 1.9 | 1.8 | 1.5 | 1.0 | — |
| Existence of constriction | None | None | None | None | None | None | Yes |
| Occurrence of melt fracture | None | None | None | None | None | None | Yes |
| Natural draft propert | ○ | ○ | ○ | ○ | ○ | × | — |

INDUSTRIAL APPLICABILITY

As described above, in accordance with the present invention, there is provided a useful leader comprising a vinylidene fluoride-based resin having an inherent viscosity of 1.0 to 1.7 dl/g which is free from the formation of a shape-unstable portion (constriction) having a smaller diameter than an average thread diameter of the tippet section and the occurrence of melt fracture at a connecting portion between the tapered section and the tippet section, and can show an excellent natural drift property, a high knot strength and a high tensile tenacity.

What is claimed is:

1. A leader for fly fishing comprising a vinylidene fluoride-based resin having an inherent viscosity of 1.0 to 1.7 dl/g, and comprising a butt section, a tapered section and a tippet section, the thread diameter of the butt section being 300 to 800 μm, the thread diameter of the tippet section being 50 to 600 μm, and the ratio value of the thread diameter of the tippet section to that of the butt section being 0.1 to 0.7.

2. The leader for fly fishing according to claim 1, wherein the inherent viscosity is 1.10 to 1.35 dl/g.

3. The leader for fly fishing according to claim 1 or claim 2, wherein the inherent viscosity is 1.15 to 1.35 dl/g.

4. A leader for fly fishing according to claim 1, which is produced by melt-spinning the vinylidene fluoride-based resin at a temperature of 200 to 300° C. to produce a tapered raw thread, and stretching the obtained tapered raw thread in a bath at a temperature of 150 to 300° C., wherein the amount of resin discharged forming the butt section is 1.0 to 3.5 cc/min and a take-off speed thereof is 1 to 3 m/min, the amount of resin discharged forming the butt section is reduced to 10 to 90% and the take-off speed thereof is increased to 100 to 1,000% for 0.5 to 3 seconds by varying a rotating speed of a gear pump and a peripheral speed of pinch rolls, and the amount of resin discharged forming the tippet section is 0.5 to 3.0 cc/min and the take-off speed thereof is 3 to 10 m/min.

* * * * *

UNITED STATES PATENT AND TRADEMARK OFFICE
CERTIFICATE OF CORRECTION

PATENT NO. : 6,170,192 B1  
DATED : January 9, 2001  
INVENTOR(S) : Nakano et al.

It is certified that error appears in the above-identified patent and that said Letters Patent is hereby corrected as shown below:

Title page,
Item [*], Notice, delete the phrase "by 0 days" and insert -- by 15 days --

Signed and Sealed this

Twenty-first Day of September, 2004

JON W. DUDAS
*Director of the United States Patent and Trademark Office*